United States Patent
Yeh et al.

(10) Patent No.: US 8,339,313 B2
(45) Date of Patent: Dec. 25, 2012

(54) POSITIONING METHOD AND NAVIGATION DEVICE

(75) Inventors: Hsin-Chung Yeh, Hsinchu (TW); Yuan Wen Ting, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 812 days.

(21) Appl. No.: 12/352,639

(22) Filed: Jan. 13, 2009

(65) Prior Publication Data
US 2010/0178930 A1  Jul. 15, 2010

(51) Int. Cl.
*G01S 19/24* (2010.01)
(52) U.S. Cl. .................................................. 342/357.63
(58) Field of Classification Search ............. 342/357.21, 342/357.46, 357.63, 357.71; 701/213, 215, 701/468; 455/456.1
See application file for complete search history.

(56) References Cited

U.S. PATENT DOCUMENTS

| | | | | |
|---|---|---|---|---|
| 5,703,597 A | * | 12/1997 | Yu et al. | 342/357.65 |
| 6,232,922 B1 | * | 5/2001 | McIntosh | 342/453 |
| 6,965,760 B1 | | 11/2005 | Chen et al. | |
| 8,094,072 B2 | * | 1/2012 | Pon | 342/357.69 |
| 2002/0154681 A1 | * | 10/2002 | Kontola | 375/147 |
| 2008/0205493 A1 | * | 8/2008 | Kohli et al. | 375/150 |

FOREIGN PATENT DOCUMENTS

CN        1287273        3/2001

* cited by examiner

*Primary Examiner* — Dao Phan
(74) *Attorney, Agent, or Firm* — McClure, Qualey & Rodack, LLP (57) ABSTRACT

A positioning method is provided, particularly adaptable for a mobile device. Satellite signals are first received from at least one satellites. At least one first search process is performed on the satellite signals by using an adjustable integration time. A tracking process is then performed when the at least one satellite is acquired in the at least one search process.

12 Claims, 9 Drawing Sheets

POSITIONING METHOD AND NAVIGATION DEVICE

BACKGROUND OF THE INVENTION

1. Field of the Invention

The invention relates to a Global Navigation Satellite System (GNSS), and in particular, to a method and navigation device for satellite acquisition.

2. Description of the Related Art

Figure 1:
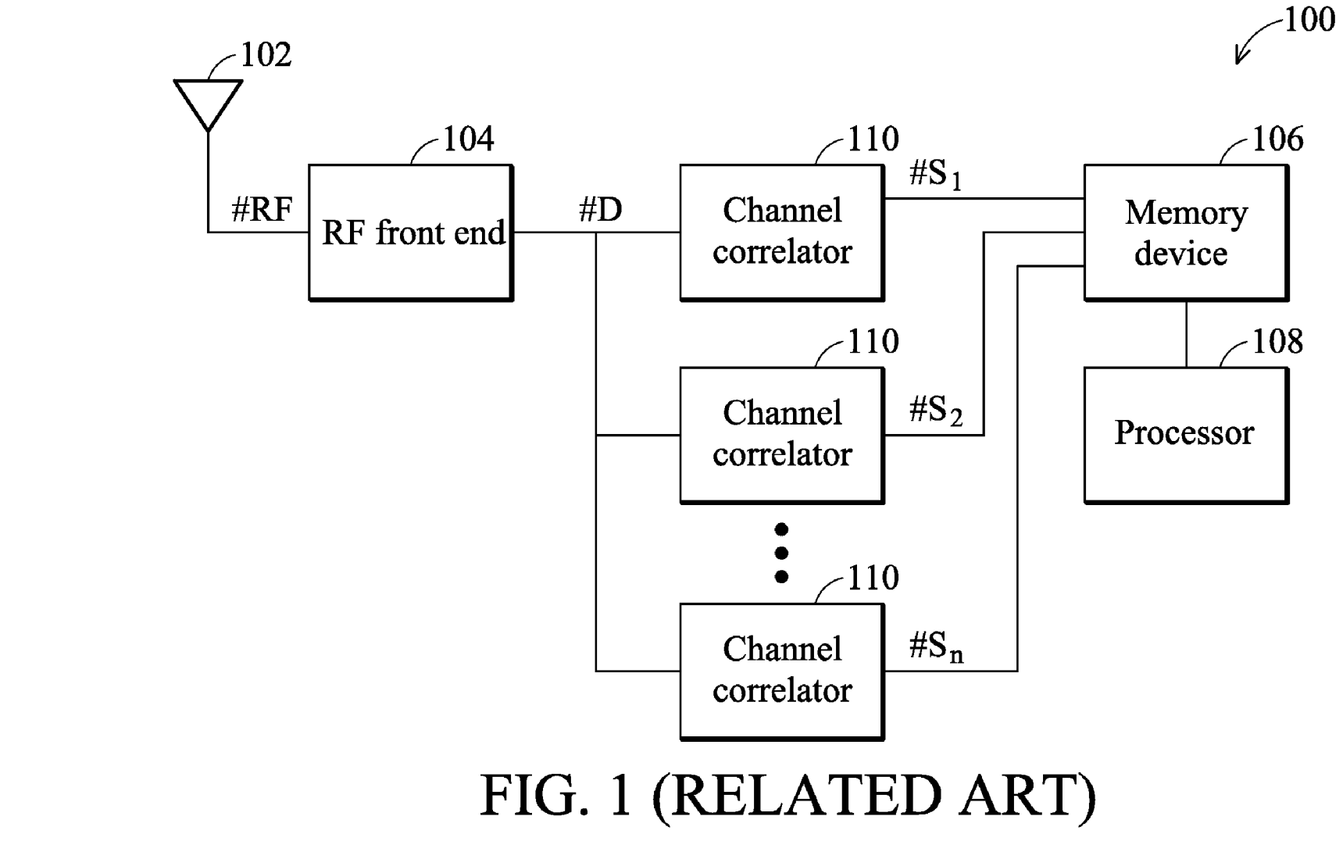
FIG. 1 shows a conventional navigation device.

FIG. 1 shows a navigation device 100 according to the related art. The navigation device 100 may be part of a mobile device such as a PDA or a cell phone, capable of locating itself based on satellite signals such as global positioning system (GPS) pseudo codes. Satellite signals #RF are first received via an antenna 102 and demodulated into digital signals #D by a RF front end 104. The navigation device 100 can simultaneously handle multiple satellites by a plurality of channel correlators 110, wherein each channel correlator 110 is dedicated to process one or more satellites. According to the present infrastructure, there is a plurality of satellites in space, delivering satellite signals embedded with coordinate information. A channel correlator 110 is a hardware channel within the navigation device 100 dedicated to process satellite signals of one or more satellites, or in other words, to search the satellites. The search results $\#S_1$ to $\#S_n$ are stored in the memory device 106, whereby the processor 108 may accordingly perform further position tracking.

A search process basically comprises a plurality of coherent/incoherent integrations within a search space formed by combinations of all possible frequency offsets versus code phases. Conventionally, a coherent/incoherent integration accumulates coherent/incoherent correlations of the digital signals #D with a pair of possible frequency offsets and code phases, and the integration time is referred to as a dwell time. The coherent/incoherent integration may be repetitively performed for several times, and all the integration results are summed to organize a correlation matrix so that detection of a peak is facilitated. In other words, it may take several mini-seconds to accumulate a correlation matrix.

Figure 2A:
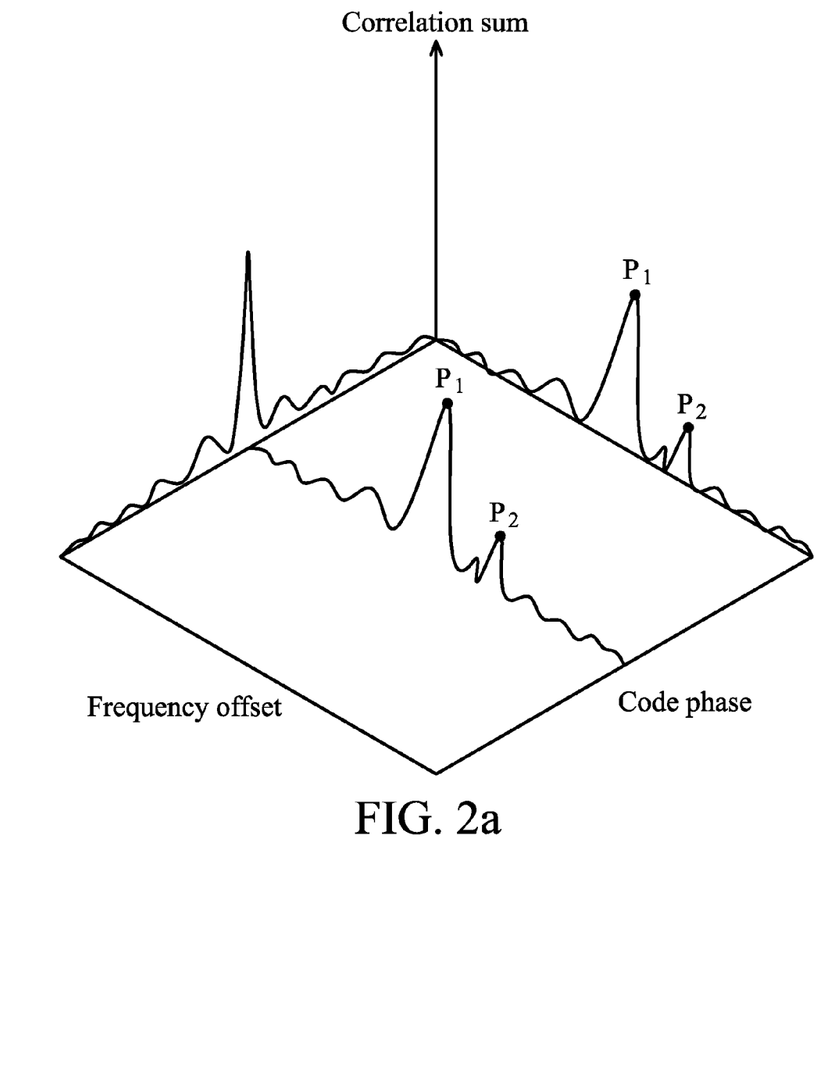
FIG. 2a shows a correlation matrixes under a good SNR environment.

FIG. 2a shows a visualized correlation matrix under a good SNR environment. The search space is formed by frequency offsets versus code phases on the x-y plane, and coherent/incoherent integration results corresponding to each pair of frequency offsets and code phases are summed to generate correlation sums in z-axis. A correlation matrix represents all correlation sums in a search space. When the satellite signals are respectively of good quality, an outstanding peak can be found in the correlation matrix, such as the node P1. In order to ensure that the node P1 is a correct result, the node P1 is compared with a second large node P2. If the ratio of P1 versus P2 exceeds a predetermined level, the node P1 is deemed the correct result, and the pair of frequency offsets and code phases associated with the node P1 is deemed a solution of the search process which is then used for position tracking.

Figure 2B:
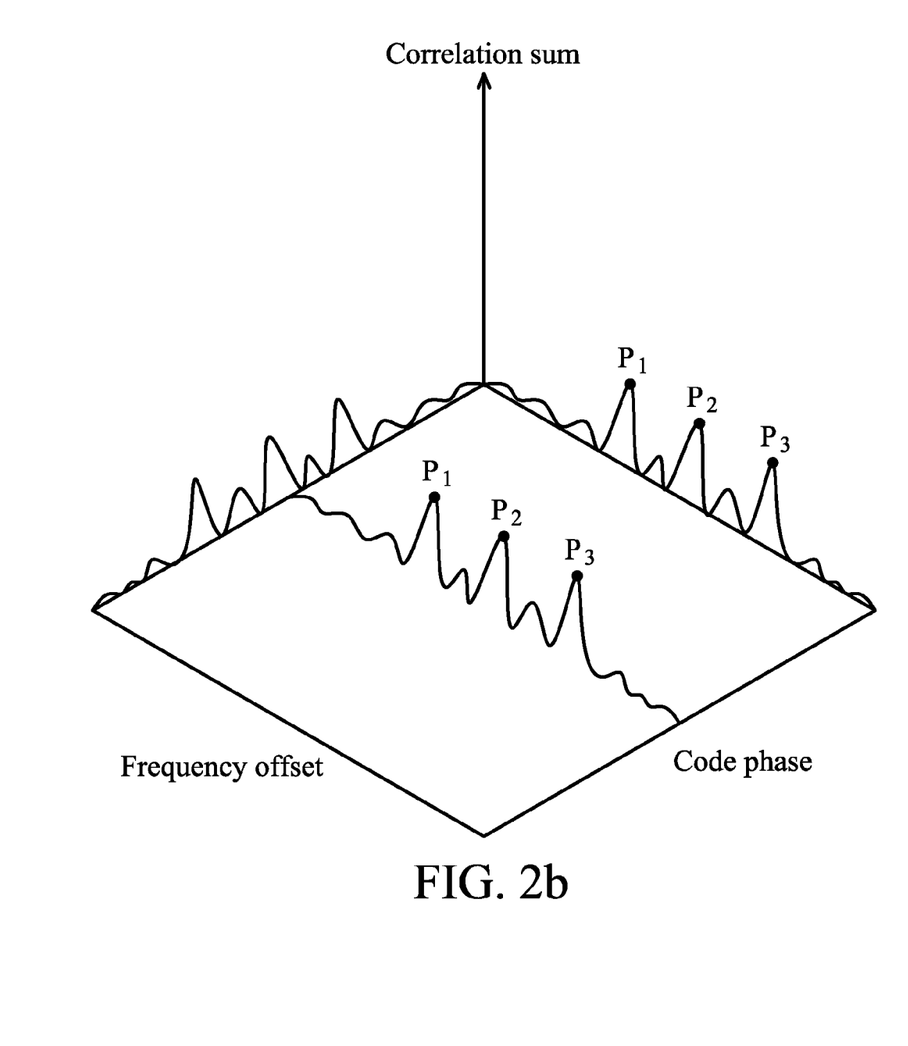
FIG. 2b shows a correlation matrixes under a bad SNR environment.

FIG. 2b shows visualized correlation matrixes under a bad SNR environment. When difficulties are encountered while receiving satellite signals, SNR may be decreased to an extent that an outstanding peak is indistinguishable. As shown in FIG. 2b, the nodes P1, P2 and P3 may have subsequently equal values which are around noise level, among which a peak is barely identifiable. To increase the sensitivity for distinguishing the peak from noises, there are various conventional approaches to enlarge the gap between those undeterminable peaks. One common solution is to increase the dwell time for coherent/incoherent integration while developing the correlation matrix. In other words, sensitivity is a tradeoff for dwell time.

Figure 3:
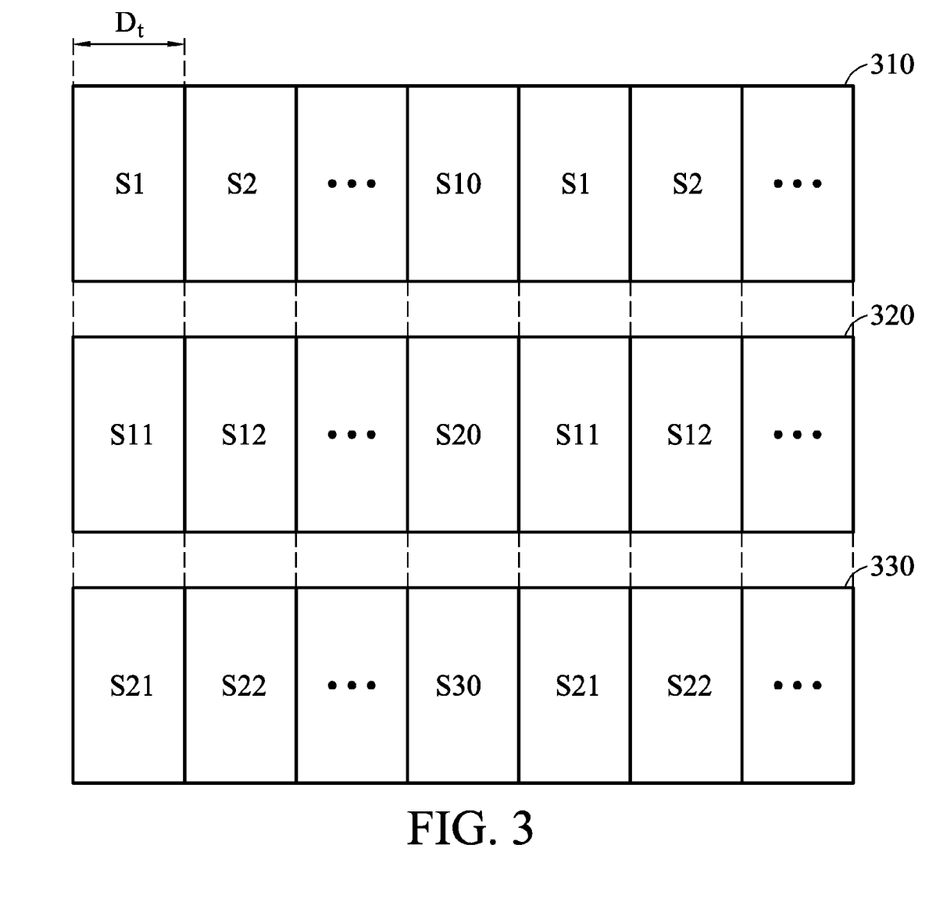
FIG. 3 shows three concurrent sequences of a plurality of search processes using a fixed dwell time.

FIG. 3 shows three concurrent sequences of a plurality of search processes using a fixed dwell time. The search processes are separated into several concurrent sequences 310, 320 and 330, each executed by a corresponding channel correlator 110. For example, the first channel correlator 110 repetitively searches satellites 1 to 10 in sequence 310 (S1 to S10), the second channel correlator 110 repetitively searches satellites 11 to 20 in sequence 320 (S11 to S20), and so on. The search processes for each satellite equivalently consumes a duration $D_t$. The duration $D_t$ is a multiple of the dwell time, during which a plurality of coherent/incoherent integrations are performed to sum up a correlation matrix. When a correlation matrix for a satellite is generated, a next search process is proceeded to search a next satellite. The correlation matrix is examined to find a peak as shown in FIG. 2a, and this step is also referred to as GPS acquisition.

Due to variation of distances and paths, signals received from different satellites may have variable strengths. Since the navigation device 100 is usually used in dynamic environments, the quality of received signals also vary from time to time. The sensitivity of a searching process is dependent on the dwell time. A longer dwell time may help to dilute noise terms and emphasize the desired terms when developing the correlation matrix under a low SNR situation, however, time consumption is a tradeoff. On the contrary, when the satellite signals exhibit high SNR, there is no need to perform the slow search processes using the long dwell time. For these reasons, a fixed dwell time seems inadequate for such a mobile application, and an enhancement is desirable.

BRIEF SUMMARY OF THE INVENTION

An exemplary embodiment of a positioning method is provided. Satellite signals are first received from at least one satellite. At least one first search process is performed on the satellite signals by using an adjustable integration time. A tracking process is then performed when the at least one satellite is acquired in the at least one search process.

Furthermore, different groups of satellites to be searched are individually scheduled into a plurality of search processes each having different integration time.

When a first search process is performed, a first search space corresponding to one satellite in the first group is formed. The first integration time is used to repetitively perform one or more coherent/incoherent integrations in the first search space. A first correlation matrix is obtained by summing integration results from the coherent/incoherent integrations. When the first correlation matrix satisfies a first criterion, the satellite in the first group is assessed as acquired.

Furthermore, satellites missed in the search process are rescheduled into a second search process. In the second search process, a second search space corresponding to one satellite in the second group is formed. The second integration time is applied to repetitively perform one or more coherent/incoherent integrations in the second search space, and results therefrom is summed to obtain a second correlation matrix. When the second correlation matrix satisfies a second criterion, the satellite in the second group is assessed as acquired.

A further embodiment provides a navigation device implementing the positioning method. An RF front end receives satellite signals from a plurality of satellites to be searched. A plurality of channel correlators are provided, each dedicated to search for one or more satellites. A memory device stores search results obtained from the channel correlators. A processor processes position tracking based on the search results. A controller provides variable integration times to the channel correlators according to a schedule. The controller individually schedules each channel correlator to repetitively search satellites using at least one integration times. The processor performs position tracking when a sufficient amount of satellites are acquired from the channel correlators.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4A:
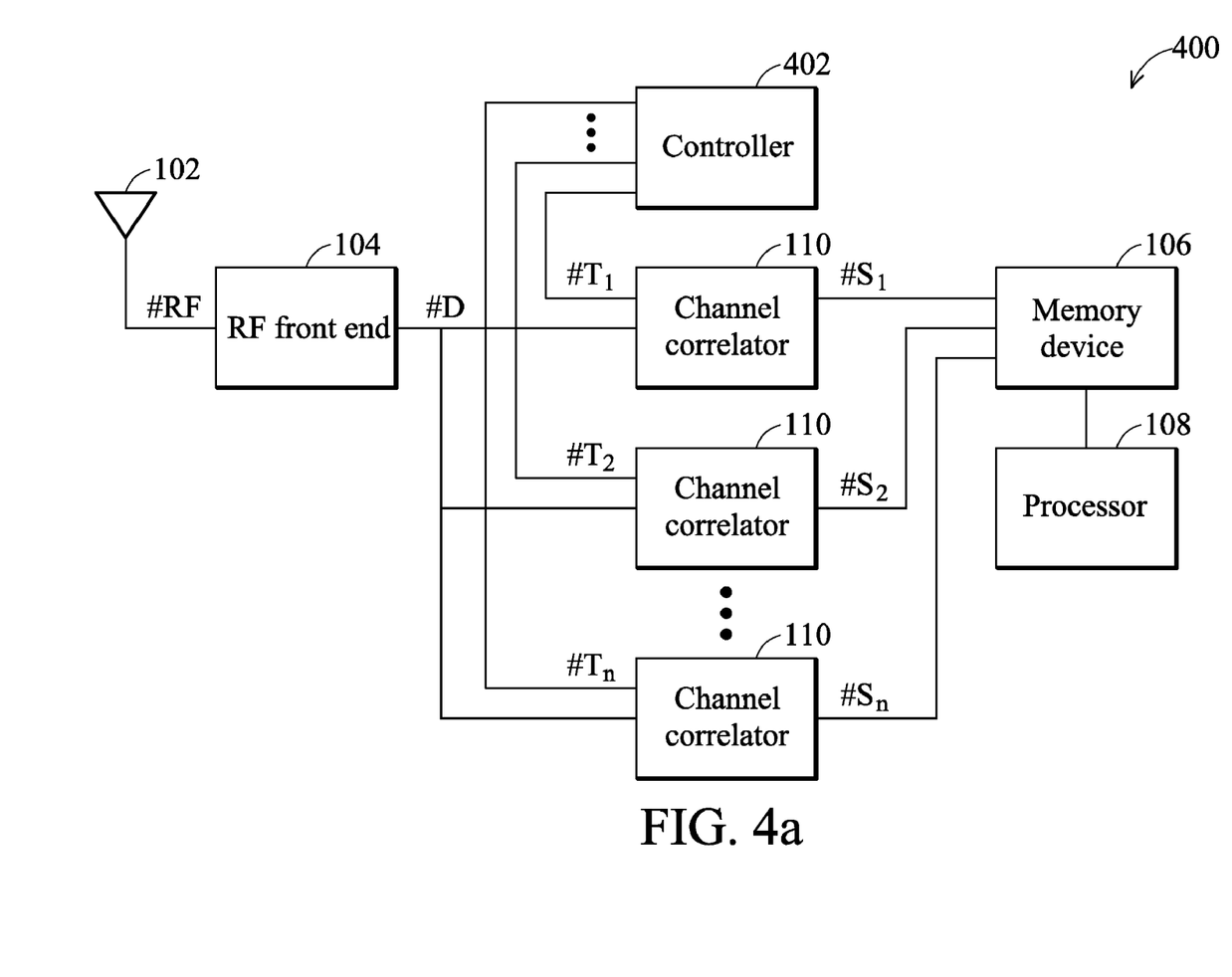
FIG. 4a shows an embodiment of a navigation device according to the invention.

FIG. 4a shows an embodiment of a navigation device 400 according to the invention. A controller 402 is added to adjust sensitivities of the channel correlators 110. First, the RF front end 104 receives Satellite signals #RF from a plurality of satellites to output a digital signal #D. A plurality of channel correlators 110 may be provided to concurrently search the satellites. For example, there may be a total of 41 satellites to be searched, and a total of three or four channel correlators 110 participate in the concurrent job search. The memory device 106 stores the search results #S$_1$ to #S$_n$ obtained from the channel correlators 110, and a processor 108 processes position tracking based on the search results. The controller 402 of the embodiment is capable of adjusting dwell times in the channel correlators 110 by issuing control signals #T$_1$ to #T$_n$ according to a schedule. The controller 402 may provide two types of dwell times, a long dwell time and a short dwell time, and the channel correlators 110 are configured accordingly to searches of the satellites. A search process of long dwell time is slower but more sensitive to weak satellite signals. Conversely, a search process of short dwell time is fast and insensitive, which is particularly adaptable for high SNR satellites. By properly defining a schedule, the navigation device 400 can be adaptively used under a quality varying environment with balanced sensitivity and efficiency.

Figure 4B:
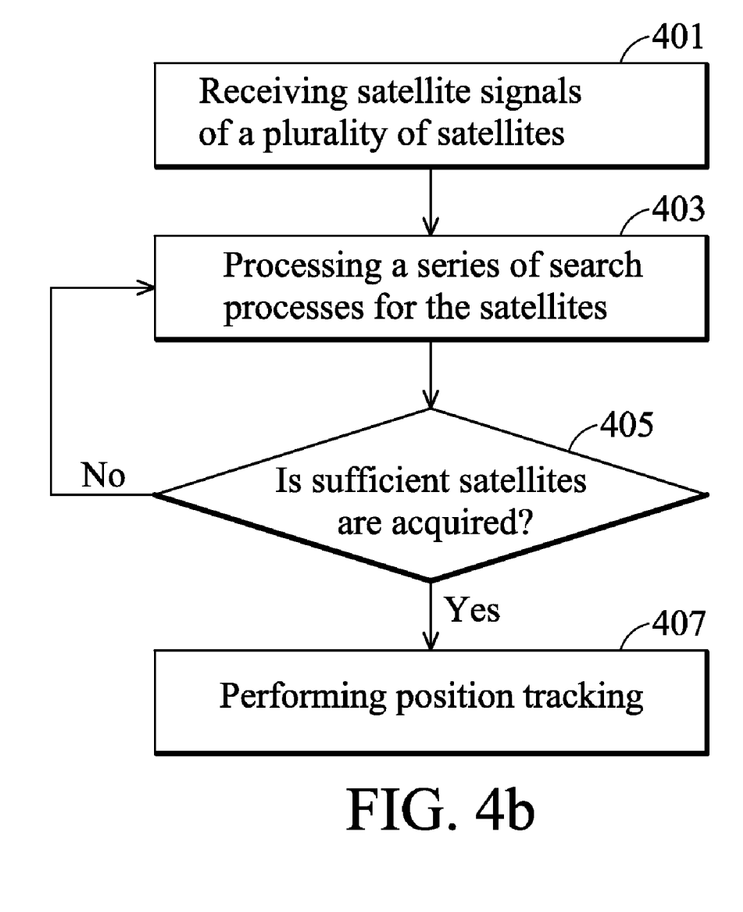
FIG. 4b is a flowchart of a positioning method according to the invention.

FIG. 4b is a flowchart of a positioning method according to the invention. In step 401, satellite signals of a plurality of satellites are received. In step 403, a series of search processes for the satellites are scheduled and performed. In step 405, it is determined whether sufficient satellites are acquired from the search processes. If not, step 403 is repeated. Otherwise, a further position tracking process is performed in step 407. Generally, at least three satellites are required to track the position, and the accuracy of position tracking is increased if more satellites are acquired. While the position tracking is processed with successfully acquired satellites, satellites that are missed in the search processes are still repetitively searched in the step 403. The successfully acquired satellites are used for position tracking, however, search processes for them may still be continuously performed. In other words, step 403 and 407 may be concurrently processed in the navigation device 400. Since position tracking is deemed as a known approach, detailed descriptions are not introduced in this specification.

Figure 5:
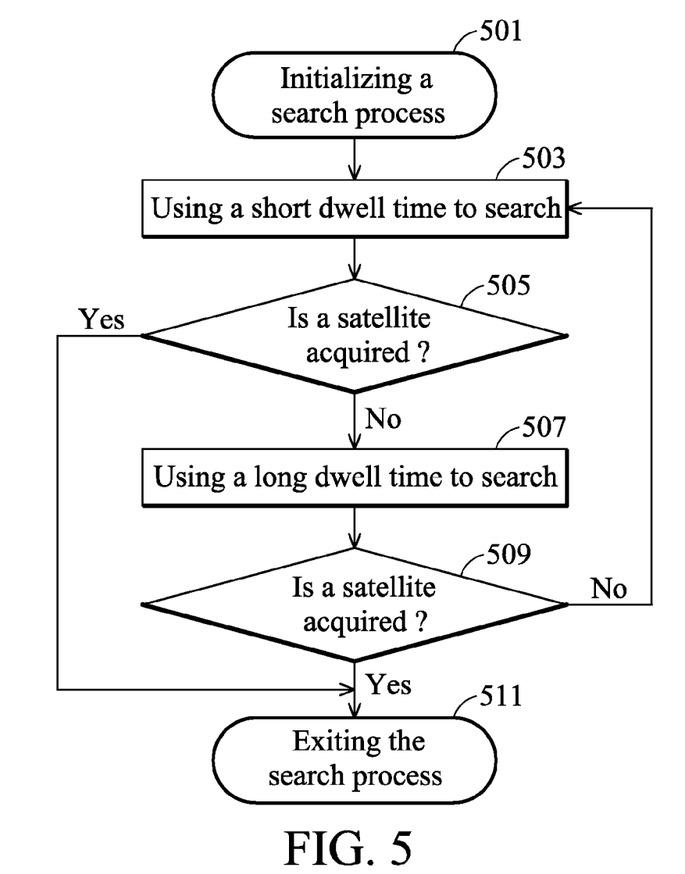
FIG. 5 is a flowchart of a search process according to FIG. 4b.

FIG. 5 is a flowchart of a search process according to FIGS. 4a and 4b. The embodiment describes search processes for one particular channel correlator. In step 501, the controller 402 initializes one of the channel correlators 110 to process the digital signal #D. At this stage, a search space as shown in FIGS. 2a and 2b is formed. In step 503, the controller 402 configures the channel correlator 110 to use a short dwell time to perform coherent/incoherent integrations in the search space, thereby a correlation matrix is generated. The short dwell time defines duration of one coherent integration, and a plurality of coherent/incoherent integrations are repetitively performed and summed to generate the correlation matrix.

In step 505, it is determined whether an outstanding peak is presented as the node P1 shown in FIG. 2a. If so, a satellite is deemed acquired, and its corresponding frequency offset and code phase is output for further position tracking. If the acquisition is unsuccessful in step 503, step 507 is processed.

In step 507, the controller 402 configures the channel correlator 110 to perform coherent/incoherent integrations using a long dwell time. Likewise, a correlation matrix is generated from the digital signals #D, and in step 509, the correlation matrix is examined to find an outstanding peak. A search process using the long dwell time is slower but more sensitive, so it has higher probability to acquire a low SNR satellite. If no peak is found, the process loops to step 503, whereby the short dwell time is used again. If the acquisition is successful, step 511 concludes the search process. Although a flowchart of FIG. 5 introduces the usages of short and long dwell times, a channel correlator 110 is not limited to search for only one satellite. The search processes for different satellites using different dwell times may be scheduled in various alternating orders.

Figure 6A:
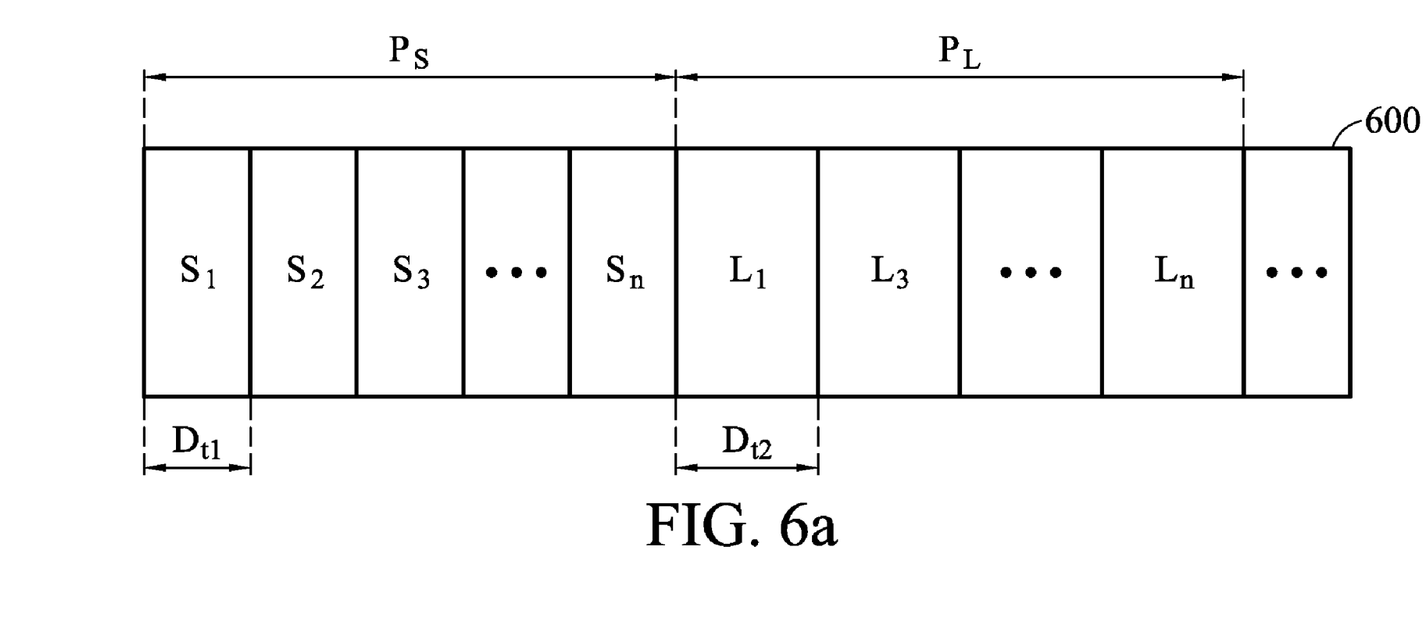
FIG. 6a shows a sequence of a plurality of search processes using different dwell times.

FIG. 6a shows a sequence of a hybrid search processes using different dwell times. The sequence 600 is represented as a time line associated with one of the channel correlators 110. In a first period P$_S$, a plurality of search processes (S$_1$ to S$_n$) using the short dwell time are scheduled, in which each search process consumes a duration D$_{t1}$. The duration D$_{t1}$ is a multiple of the short dwell time depending on repetitions of the coherent/incoherent integrations performed in each search process. The search dimension is also a parameter to determine the duration D$_{t1}$. If the search dimension comprises four frequency bands, the duration D$_{t1}$ is 4*coherent*incoherent. For example, if the short dwell time is assigned to be 2 ms, and the repetition is 10 times, the duration D$_{t1}$ for a search process is 2 ms*4*10=80 ms. When all search processes are performed in the period P$_S$, missed satellites are rescheduled into long search processes using the long dwell time in period P$_L$(L$_1$ to L$_n$). Note that if a short search process S$_2$ is successful, a corresponding long search process L$_2$ is not necessary, so the long search process L$_2$ is not scheduled in the period P$_L$. If the long dwell time is 8 ms, the repetition of the coherent/incoherent integration would be 32 times. Thus, the duration D$_{t2}$ consumed by each long search process would be 8*32*search dimension (ms). After the period P$_L$, analogically, missed satellites are recursively rescheduled using the short and long dwell times.

Figure 6B:
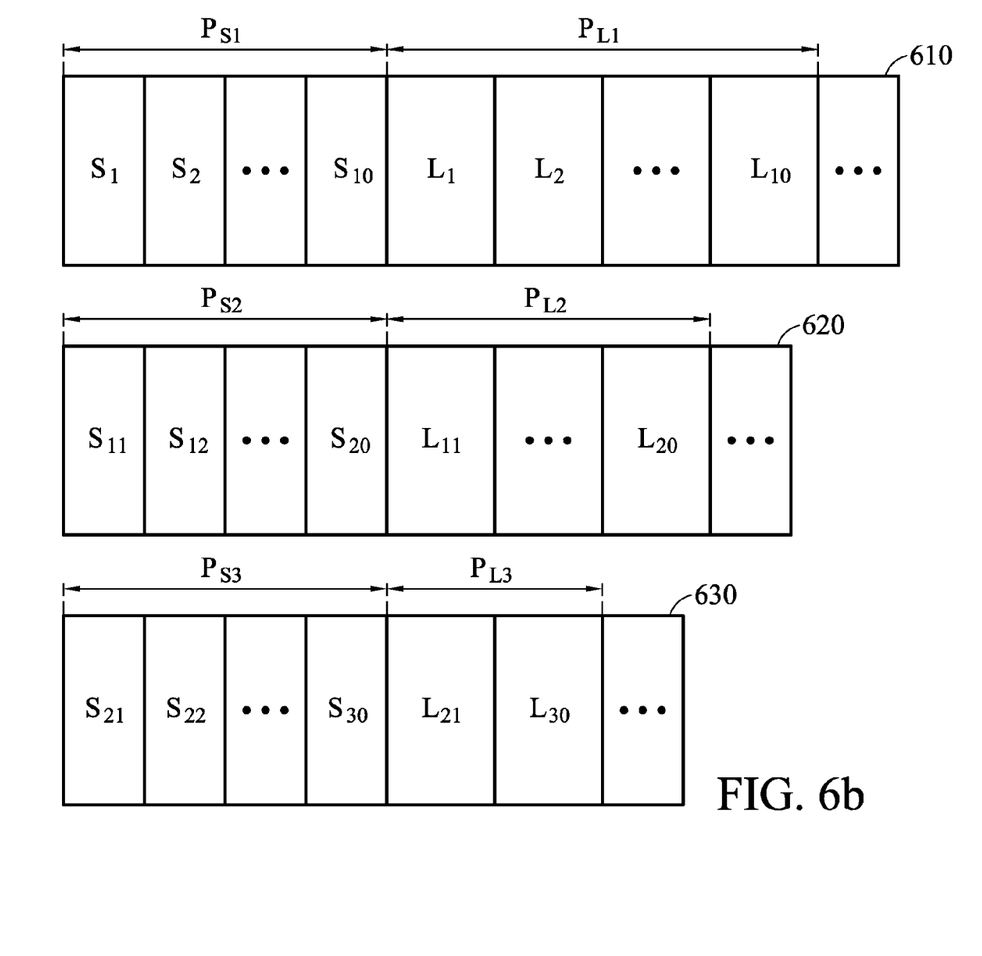
FIG. 6b shows concurrent sequences of a plurality of search processes using different dwell times.

FIG. 6b shows concurrent sequences of hybrid search processes using different dwell times. In the embodiment, three sequences 610, 620 and 630 are presented, each associated with a channel correlator 110, whereby thirty search processes 1 to 30 are scheduled. The search processes in the sequences are individually and simultaneously processed. Initially, short search processes $S_1$ to $S_{10}$ are processed in period $P_{S1}$, $S_{11}$ to $S_{20}$ are processed in period $P_{S2}$, and $S_{21}$ to $S_{30}$ in period $P_{S3}$. The periods $P_{S1}$, $P_{S2}$ and $P_{S3}$ are actually identical because each equivalently comprises ten search processes. In sequence 610, the Period $P_{S1}$ is followed by period $P_{L1}$. In period $P_{L1}$, if no satellite is successfully acquired in search processes $S_1$ to $S_{10}$, long search processes $L_1$ to $L_{10}$ are scheduled to search the satellites again. In schedule 602, the period $P_{S2}$ is followed by period $P_{L2}$, and likewise, satellites un-acquired in period $P_{S2}$ are searched by long search processes in period $P_{L2}$. In sequence 630, the period $P_{S3}$ is followed by period $P_{L3}$. As an example, if only satellites number 21 and 30 are un-acquired in period $P_{S3}$, two long search processes $L_{21}$ and $L_{30}$ are scheduled in period $P_{L3}$. The total satellites are not limited to be thirty, and the arrangement of the periods may also be varied. Two different dwell times are used in the embodiment, and it can be further modified to be multi-level. Since sensitivity of the search process is a tradeoff for dwell time, the hybrid search processes can efficiently acquire high SNR channels in short time before employing slow search processes for low SNR satellite signals.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A positioning method for a mobile device, comprising:
receiving satellite signals from at least one satellites;
performing at least one search process on the satellite signals by using an adjustable integration time, wherein the at least one search process has different integration time; and
performing a tracking process when the at least one satellite is acquired in the at least one search processes.

2. The positioning method as claimed in claim 1, further comprising individually scheduling a plurality of groups of satellites into a plurality of search processes.

3. The positioning method as claimed in claim 2, wherein the step of performing the at least one search process comprises performing a first search process for a first group of satellites, comprising:
forming a first search space corresponding to one satellite in the first group;
using a first integration time to repetitively perform one or more coherent/incoherent integrations in the first search space;
summing results from the one or more coherent/incoherent integrations to obtain a first correlation matrix; and
when the first correlation matrix satisfies a first criterion, assessing the satellite in the first group as acquired.

4. The positioning method as claimed in claim 3, wherein:
the step of performing the at least one search process further comprises performing a second search process for a second group of satellites; and
the step of scheduling comprises, rescheduling satellites missed in the first search process into the second search process.

5. The positioning method as claimed in claim 4, wherein the second search process comprises:
forming a second search space corresponding to one satellite in the second group;
using the second integration time to repetitively perform one or more coherent/incoherent integrations in the second search space;
summing results of the one or more coherent/incoherent integrations to obtain a second correlation matrix; and
when the second correlation matrix satisfies a second criterion, assessing the satellite in the second group as acquired.

6. The positioning method as claimed in claim 5, further comprising:
rescheduling satellites which are missed in the first and second search processes into a new schedule; and
repeating the first and second search processes according to the new schedule.

7. The positioning method as claimed in claim 1, wherein the step of position tracking comprises tracking the acquired satellites to locate the mobile device.

8. A navigation device for processing satellite signals received from a plurality of satellites to be searched, comprising:
at least one channel correlators, each dedicated to search for one or more satellites;
a memory device, coupled to the channel correlators, storing search results obtained from the channel correlators;
a processor, coupled to the memory device, processing position tracking based on the search results; and
a controller, coupled to the channel correlators, providing variable integration times to the channel correlators according to a schedule; wherein:
the controller individually schedules each channel correlator to repetitively search satellites using at least one integration times; and
the processor performs position tracking when a sufficient amount of satellites are acquired from the channel correlators.

9. The navigation device as claimed in claim 8, wherein when a channel correlator is configured with a first integration time:
the channel correlator forms a first search space corresponding to a satellite;
the channel correlator uses the first integration time to repetitively perform one or more coherent/incoherent integrations in the first search space; and
the channel correlator sums results from the coherent/incoherent integrations to obtain a first correlation matrix,
wherein when the first correlation matrix satisfies a first criterion, the satellite is deemed acquired.

10. The navigation device as claimed in claim 9, wherein if the channel correlator fails searching the satellite using the first integration time, the controller schedules the channel correlator to search the satellite using a second integration time.

11. The navigation device as claimed in claim 9, wherein when the channel correlator is configured with a second integration time:
the channel correlator forms a second search space corresponding to the satellite;
the channel correlator uses the second integration time to repetitively perform one or more coherent/incoherent integrations in the second search space; and
the channel correlator sums results from the coherent/incoherent integrations to obtain a second correlation matrix,
wherein when the second correlation matrix satisfies a second criterion, the satellite is deemed acquired.

12. The navigation device as claimed in claim 8, wherein the processor tracks the acquired satellites to locate the navigation device.

* * * * *